(12) United States Patent
Baehrle-Miller

(10) Patent No.: US 11,945,459 B2
(45) Date of Patent: Apr. 2, 2024

(54) METHOD FOR OPERATING A MOTOR VEHICLE DURING AN AUTONOMOUS PARKING PROCESS, COMPUTER PROGRAM, ELECTRICAL STORAGE MEDIUM AND OPEN- LOOP AND CLOSED-LOOP CONTROL DEVICE FOR A MOTOR VEHICLE

(71) Applicant: Robert Bosch GmbH, Stuttgart (DE)

(72) Inventor: Frank Baehrle-Miller, Schoenaich (DE)

(73) Assignee: Robert Bosch GmbH, Stuttgart (DE)

( * ) Notice: Subject to any disclaimer, the term of this patent is extended or adjusted under 35 U.S.C. 154(b) by 281 days.

(21) Appl. No.: 17/273,086

(22) PCT Filed: Aug. 27, 2019

(86) PCT No.: PCT/EP2019/072819
§ 371 (c)(1),
(2) Date: Mar. 3, 2021

(87) PCT Pub. No.: WO2020/052962
PCT Pub. Date: Mar. 19, 2020

(65) Prior Publication Data
US 2021/0323571 A1    Oct. 21, 2021

(30) Foreign Application Priority Data
Sep. 14, 2018    (DE) .................... 10 2018 215 701.4

(51) Int. Cl.
*B60W 50/14*    (2020.01)
*B60W 30/06*    (2006.01)
*B60W 60/00*    (2020.01)

(52) U.S. Cl.
CPC ............ *B60W 50/14* (2013.01); *B60W 30/06* (2013.01); *B60W 60/001* (2020.02);
(Continued)

(58) Field of Classification Search
CPC .... B60W 50/14; B60W 30/06; B60W 60/001; B60W 2520/06; B60W 2520/263;
(Continued)

(56) References Cited

U.S. PATENT DOCUMENTS 3,981,545 A    9/1976    Eddy
4,395,761 A    7/1983    Sato et al.
(Continued)

FOREIGN PATENT DOCUMENTS

CN    104709273 A    6/2015
CN    106414206 A    2/2017
(Continued)

OTHER PUBLICATIONS

International Search Report corresponding to PCT Application No. PCT/EP2019/072819, dated Nov. 18, 2019 (German and English language document) (5 pages).

*Primary Examiner* — Vivek D Koppikar
*Assistant Examiner* — Joan T Goodbody
(74) *Attorney, Agent, or Firm* — Maginot, Moore & Beck LLP

(57) ABSTRACT

In a method for operating a motor vehicle during an autonomous parking process it is proposed that during the autonomous parking process a first braking torque is applied automatically to at least a first wheel, and a second braking torque is applied automatically to at least a second wheel, that a slip of one of the wheels is inferred from a comparison of the rotational speed of the first wheel to which the first braking torque is applied with the rotational speed of the second wheel to which the second braking torque is applied, and that if a variable characterizing the slip reaches or exceeds a limiting value, an action is automatically triggered.

14 Claims, 3 Drawing Sheets

(52) U.S. Cl.
CPC ... *B60W 2520/06* (2013.01); *B60W 2520/263* (2013.01); *B60W 2520/28* (2013.01); *B60W 2552/25* (2020.02); *B60W 2555/20* (2020.02); *B60W 2710/18* (2013.01); *B60W 2720/24* (2013.01)

(58) Field of Classification Search
CPC ......... B60W 2520/28; B60W 2552/25; B60W 2555/20; B60W 2710/18; B60W 2720/24; B60T 7/22; B60T 2201/10; B60T 2210/12; B60T 8/17616; B60T 8/172
See application file for complete search history.

(56) References Cited

U.S. PATENT DOCUMENTS

| | | | |
|---|---|---|---|
| 2007/0222285 A1 | 9/2007 | Ribbens et al. | |
| 2007/0282504 A1* | 12/2007 | Luke | B62D 15/0285 701/44 |
| 2009/0069993 A1 | 3/2009 | Inoue et al. | |
| 2010/0191434 A1 | 7/2010 | Fujita et al. | |
| 2011/0295457 A1* | 12/2011 | Linda | B60T 8/172 701/498 |
| 2012/0029783 A1* | 2/2012 | Takenaka | B60T 8/172 701/73 |
| 2018/0217050 A1 | 8/2018 | Heil et al. | |

FOREIGN PATENT DOCUMENTS

| | | | | |
|---|---|---|---|---|
| CN | 107207011 A | | 9/2017 | |
| DE | 10 2014 008 374 A1 | | 12/2015 | |
| DE | 10 2015 222 934 A1 | | 5/2017 | |
| DE | 10 2016 208 766 A1 | | 6/2017 | |
| DE | 10 2016 203 138 A1 | | 8/2017 | |
| DE | 102016104575 | * | 9/2017 | ......... B62D 15/0285 |
| EP | 2 913 235 A1 | | 9/2015 | |
| GB | 2554760 | * | 4/2018 | ................ B60T 7/12 |
| WO | 81/03151 | | 11/1981 | |
| WO | WO 8103151 | * | 11/1981 | ............. B60T 11/34 |
| WO | WO 2018041575 | * | 3/2018 | ........ B60W 60/0015 |

* cited by examiner

METHOD FOR OPERATING A MOTOR VEHICLE DURING AN AUTONOMOUS PARKING PROCESS, COMPUTER PROGRAM, ELECTRICAL STORAGE MEDIUM AND OPEN- LOOP AND CLOSED-LOOP CONTROL DEVICE FOR A MOTOR VEHICLE

This application is a 35 U.S.C. § 371 National Stage Application of PCT/EP2019/072819, filed on Aug. 27, 2019, which claims the benefit of priority to Serial No. DE 10 2018 215 701.4, filed on Sep. 14, 2018 in Germany, the disclosures of which are incorporated herein by reference in their entirety.

BACKGROUND

The disclosure relates to a method for operating a motor vehicle during an autonomous parking process, a computer program, an electrical storage medium, and an open-loop and closed-loop control device for a motor vehicle, each according to the definitions of the species of the other independent claims.

From the market, it is known that motor vehicles park autonomously, i.e., without intervention by a driver. In the process, the motor vehicle is maneuvered into an intended parking space with or without direct driver interaction. For example, it can be provided that the motor vehicle is handed off at a delivery point in a parking garage and then automatically seeks a parking space, or that the motor vehicle automatically unparks and is received again by a driver at a delivery point. EP 913 235 A1 describes a device for controlling an automatic parking process, which ascertains a slip condition in the normal driving operation.

SUMMARY

The problem addressed by the disclosure is solved by a method for operating a motor vehicle during an autonomous parking process. An "autonomous parking process" is understood to be both parking and unparking, and the term "autonomous" can also include a contribution by a driver up to a certain extent.

According to the disclosure, it is provided, during the autonomous parking process, that a first braking torque is applied to at least a first wheel, and a second braking torque is applied to at least a second wheel in an automated way, i.e., without intervention by a driver and, instead, for example, by a vehicle control. In the normal case, this does not take place in conjunction with a desired deceleration of the vehicle, but rather with the objective of analyzing the driving condition. A slip of one of the wheels can be inferred from a comparison of the rotational speed of the first wheel to which the first braking torque is applied with the rotational speed of the second wheel to which the second braking torque is applied. If it is detected that a variable characterizing the slip, for example, a speed differential, reaches or exceeds a limiting value, an action can be automatically triggered, by means of which the parking process is influenced, for example, in an automated way, and the parking process is prevented from not taking place in the desired and intended way due to a detected slip.

The disclosure is based on the consideration that, during a highly automated, autonomous parking process, the vehicle may also possibly need to cover longer distances without a driver being able to exert influence. This is conceivable, for example, for the case in which the vehicle is handed off, i.e., left by the driver, at a delivery point, and then automatically seeks a parking space, for example, in a parking garage or on a larger site. In order to ensure that this can be carried out reliably, the surface on which the vehicle autonomously moves should have the best grip possible. It cannot be expected of a driver, however, that he/she inspects in advance, with respect thereto, all possible routes that the vehicle can automatically cover.

With the method according to the disclosure, it is possible to check, during the autonomous parking process, in an automated way, nevertheless without additional special sensors such as a camera, ultrasound, a laser, etc., whether a continuation of the autonomous parking process is safely possible, in that an inspection is automatically carried out to determine whether the surface tends to be smooth ("low $\mu$") or tends to have good grip ("high $\mu$"). The means known from usually installed ESP and ABS systems, namely sensors that detect the rotational speed of the individual wheels of a vehicle, are fully utilized. Moreover, it is understood that the braking torques, according to the disclosure, can be applied by means of the normal service brake and by means of a parking brake, for example, an electric parking brake ("EPB").

Physically, the disclosure is directed to the fact that braking torques at different wheels, for the case in which both wheels are on a surface having a good grip (high $\mu$), result in no or only minor speed differentials between the wheels. However, if the surface on which one wheel or both wheels is/are located is slippery (low $\mu$), braking torques at different wheels result in different rotational speeds.

In one possible refinement of the disclosure, it is provided that the first wheel and the second wheel are wheels of a same, driven or non-driven axle of the motor vehicle. This is a highly sensitive variant, since a differential speed between the two wheels sets in relatively quickly on a surface having a low friction coefficient (low $\mu$).

It is particularly preferred when the wheels of the axle that is situated at the front in the movement direction of the vehicle, i.e., the front axle in the case of a forward movement and the rear axle in the case of a movement in reverse, are utilized for the method according to the disclosure. In this way, a slippery surface can be detected both during forward travel and during travel in reverse, before all wheels of the vehicle are located on the slippery surface.

In one possible refinement of the disclosure, it is provided that the first wheel and the second wheel are wheels of different axles of the motor vehicle, in particular wherein one axle is driven and one axle is non-driven. If the wheels of the driven axle come onto a slippery surface, while the wheels of the non-driven axle are on a non-slippery surface, and if a braking torque is applied to a wheel of the non-driven axle, the wheels of the driven axle will have a higher rotational speed than the wheels of the non-driven axle, which can be very easily detected, as can the reverse case.

In one possible refinement of the disclosure, it is provided that the two braking torques are identical. This is technically very easily implemented.

In one possible refinement of the disclosure, it is provided that the two braking torques are different. This is a highly sensitive variant. If the braked wheels are the two wheels of a driven axle, the slip will occur at the wheel braked to a lesser extent, the rotational speed of which is then higher than that of the wheel braked to a greater extent. If the two braked wheels are the two wheels of a non-driven axle, the slip will occur at the wheel braked to a greater extent, the rotational speed of which is then lower than that of the wheel braked to a lesser extent.

In one possible refinement, it is provided that the second braking torque is equal to zero. In this case, the sensitivity of the method is particularly high.

In one possible refinement of the disclosure, it is provided that the first braking torque and/or the second braking torque is/are applied discontinuously, preferably cyclically. As a result, the energy efficiency is increased. In principle, it is also conceivable, however, that the first braking torque and/or the second braking torque are/is continuously applied.

In one possible refinement, it is provided that a cycle time corresponds to the time it takes for the motor vehicle to travel a certain distance. It is preferred when the certain distance is approximately in the range from ⅓ to ⅔ of a distance between the two axles of the motor vehicle. As a result, it is ensured that one axle is still always on a surface having a good grip and the vehicle can therefore be safely decelerated.

In one possible refinement of the disclosure, it is provided that the action is at least one from the following group: Outputting a piece of information to a driver; interrupting the parking process; driving the vehicle in reverse until it is detected that a variable characterizing the slip falls below a limiting value; driving the vehicle in reverse into a starting position.

As a result, the safety during the parking process can be considerably improved.

In principle, one further differentiation is possible: When a relevant slip is detected at only one single wheel, it can be decided, for example, to continue the parking process. However, if a slip is detected at more than one wheel, for example, at both wheels of an axle, one of the above-listed actions or an entirely different action can take place.

In one possible refinement of the disclosure, it is provided that the intensity of the first braking torque and/or the intensity of the second braking torque depends(s) on a parameter that is at least one from the following group: Inclination of a surface, on which the motor vehicle is located; parking situation; ambient temperature; time of the year; precipitation. With regard for the inclination of the surface, the braking torque can be reduced, for example, in the case of a greater inclination or slope. As a result, advantage can be taken of the fact that the contact forces at a front axle or a rear axle change depending on the slope and, as a result, a slippery surface can also be more easily detected.

The term the "parking situation" is understood to be the general situation in which the parking process takes place, for example, whether it is an underground parking garage or a multilevel parking garage, or a freestanding parking space, etc. This can be established, for example, by means of GPS location determination. Within an underground parking garage or in multilevel parking garage, for example, certain minimum friction coefficients are to be assumed, and a surface having a very slippery friction coefficient is very unlikely. In such a situation, the parking process can be carried out, for example, completely without partially braked wheels, which is the better solution in terms of energy.

The taking into account of the ambient temperature can also be utilized for parking and/or unparking, without partially braked wheels, if necessary, since black ice is likely only when a certain temperature, for example, of 4° C., is fallen below. Moreover, the implementation of the method can also depend on the time of year. Wet leaves or snow or ice are likely only in the fall or winter, whereas this is less likely to be the case in the summer. The time of year can be detected, for example, using the clock installed in a vehicle, and the implementation of the method can tend to be blocked during the summer months. In addition, for example, the precipitation could result in a wet roadway and, therefore, in a reduced grip, which can be detected, for example, via an actuation of the windshield wiper during the trip immediately before the parking process.

The disclosure also relates to a computer program, which is programmed for carrying out the above-described method.

The disclosure also relates to an electrical storage medium for an open-loop and/or closed-loop control device of a motor vehicle, on which a computer program is stored for carrying out the aforementioned method, and an open-loop and closed-loop control device for a motor vehicle, with a processor and a memory, which is designed for carrying out the above-described method.

BRIEF DESCRIPTION OF THE DRAWING

An embodiment of the disclosure is explained in the following with reference to the attached drawing. In the drawing.

DETAILED DESCRIPTION

Figure 1:
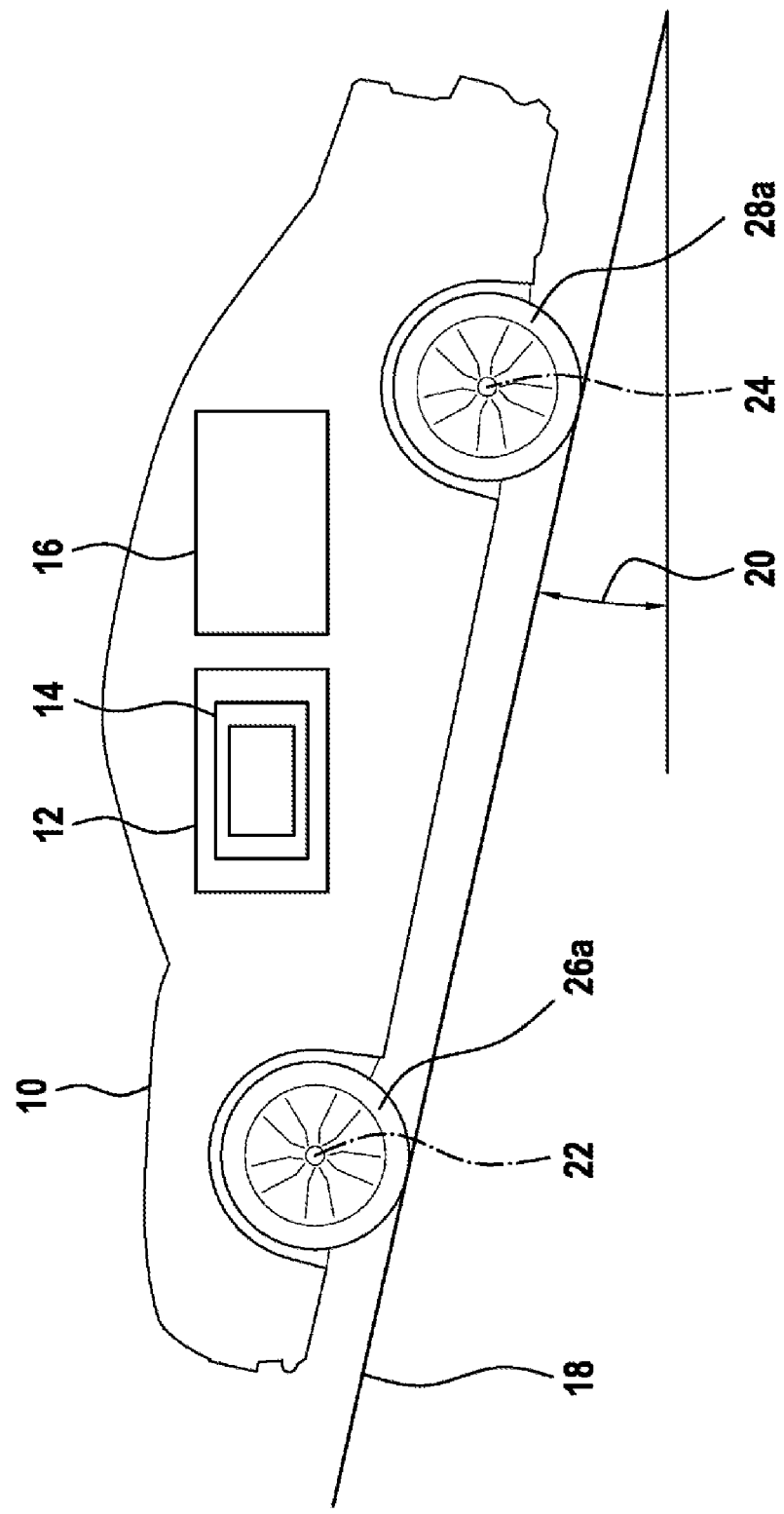
FIG. 1 shows a side view of a motor vehicle on a surface, wherein the motor vehicle includes an open-loop and/or closed-loop control device.
Figure 2:
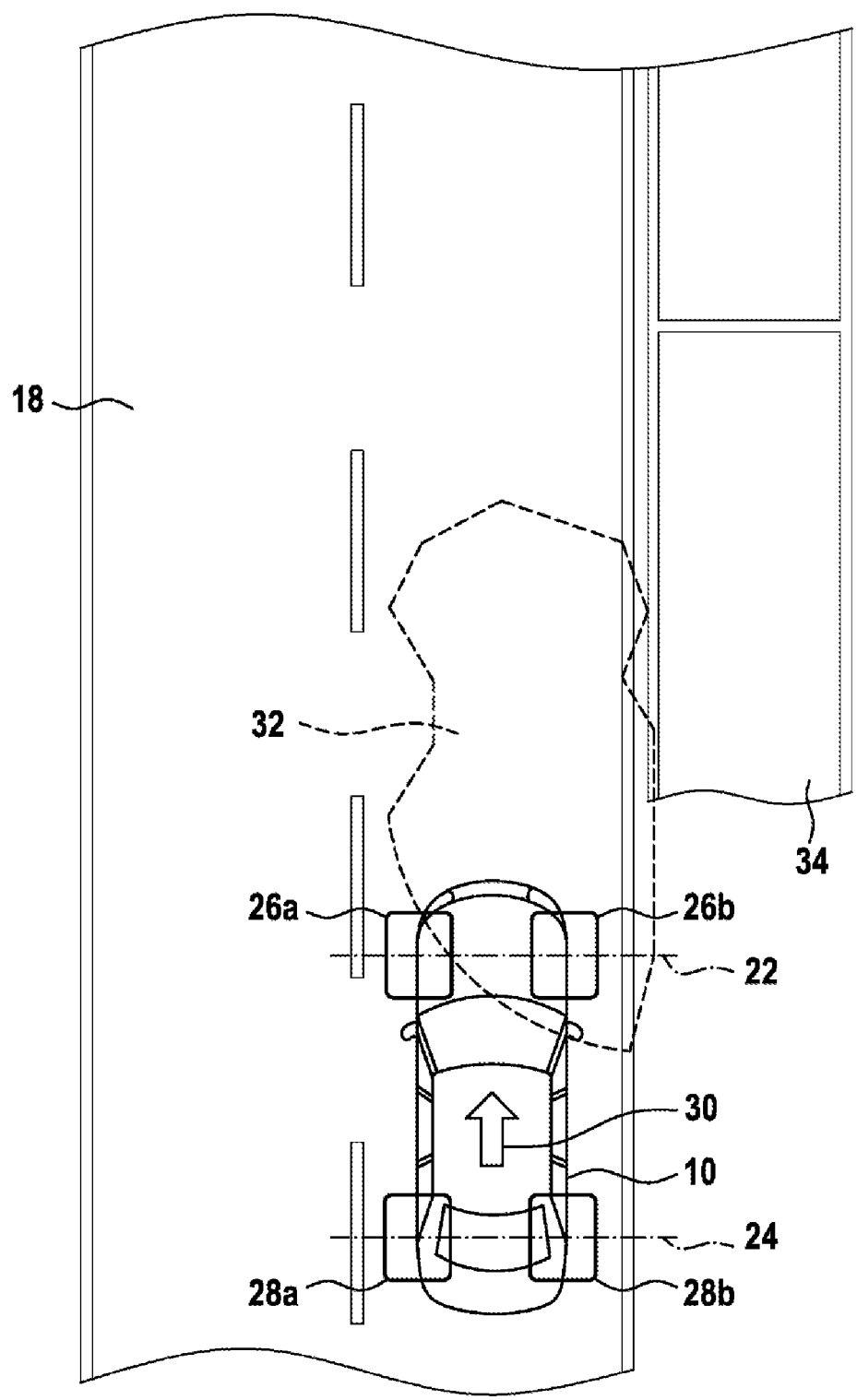
FIG. 2 shows a top view of the motor vehicle from FIG. 1 during an autonomous parking process.

A motor vehicle is labeled overall with reference numeral 10 in FIGS. 1 and 2. It includes an open-loop and closed-loop control device 12, which, overall, controls the operation of the motor vehicle 10 by way of an open-loop and/or closed-loop system. It is understood that the open-loop and closed-loop control device 12 can be made up of different electronic devices, which communicate with each other and which are situated at different locations within the motor vehicle 10. The open-loop and closed-loop control device 12 includes at least one processor 14 and at least one electrical storage medium 16. Stored thereon is, among other things, a computer program for carrying out a method, which runs during an autonomous parking process and which is explained in greater detail further below.

The motor vehicle 10 is located, in the present case, on a surface 18, for example, a roadway, which is slanted at an angle 20 with respect to the horizontal. Moreover, the motor vehicle includes a front axle 22 and a rear axle 24. In the present case and merely by way of example, the front axle 22 is driven, whereas the rear axle 24 is non-driven. The two wheels of the front axle 22 are labeled with the reference numerals 26a and 26b, and the two wheels of the rear axle 24 are labeled with the reference numerals 28a and 28b (FIG. 2). Moreover, in the top view of FIG. 2, the movement direction of the motor vehicle is indicated by an arrow 30, and an area of the surface 18 located directly ahead of the motor vehicle 10, viewed in the movement direction 30, which is comparatively slippery ("low μ") as compared to the rest of the surface 18, is labeled with the reference numeral 32. A parking space 34 is located laterally with respect to the surface 18, into which the motor vehicle 10 is to park autonomously, i.e., without any intervention by a driver. For this purpose, the motor vehicle 10 includes a number of sensors, for example, cameras, which are not represented. By means of these sensors, the general geometric parking situation is detected and the vehicle is automatically and autonomously parked in the parking space 34.

Figure 3:
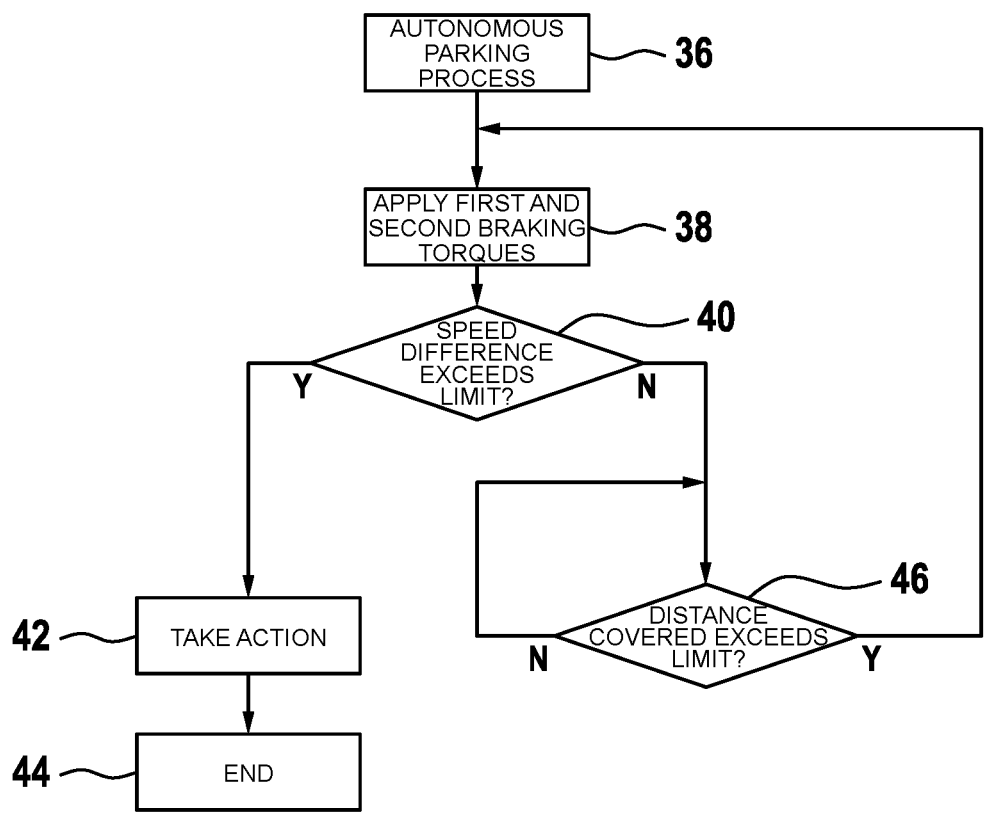
FIG. 3 shows a flow chart of a method for operating the motor vehicle from FIGS. 1 and 2 during the autonomous parking process.

In order to increase the safety during the automatic parking process, an investigation is carried out during the parking process by means of a method described in the following, in order to determine whether the surface 18 has sufficiently good grip for the safe implementation of the parking process. For this purpose, reference is now made to FIG. 3, which describes one of several possible specific embodiment variants, only by way of example, however.

The method starts in a block 36 during the autonomous parking process, i.e., during an autonomously implemented movement of the motor vehicle 10 in the movement direction 30 with the objective of automatically maneuvering the motor vehicle 10 from the surface 18 onto the parking space 34. In a subsequent block 38, a first braking torque is applied to the left front wheel 26a of the front axle 22 and a second braking torque is applied to the right front wheel 26b of the front axle 22. The two braking torques are not equal to zero, although they are different. In the present case, by way of example, the second braking torque, which is applied to the right front wheel 26b, is greater than the first braking torque, which is applied to the left front wheel 26a.

Now, in a block 40, a comparison is carried out of the rotational speed of the left front wheel 26a to which the first braking torque is applied with the rotational speed of the right front wheel 26b to which the second braking torque is applied. For this purpose, rotational speed sensors (not shown in the drawing) are utilized, which deliver appropriate signals to the open-loop and closed-loop control device 12. It is apparent from FIG. 2 that the right front wheel 26b is located on the slippery area 32 (low μ situation), whereas the left front wheel 26a is located outside the slippery area 32 (high μ situation).

In conjunction with the two braking torques, different rotational speeds now set in at the two front wheels 26a and 26b. In the present merely exemplary situation, a significant slip sets in at the right front wheel 26b, since this is in the slippery area 32, which is made apparent by the fact that the rotational speed of the right front wheel 26b is lower than the rotational speed of the left front wheel 26a. In the block 40, the difference between the rotational speed of the right front wheel 26b and the rotational speed of the left front wheel 26a is now ascertained, and the absolute value of this difference is compared to a limiting value. If the absolute value of the difference reaches or exceeds the limiting value, an action takes place in the block 42. Thereafter, the method ends in the block 44.

The action can be that a piece of information, for example, a warning message, is output to the driver. If the driver is still located in the vehicle, he/she can then immediately and directly decide him/herself how to further proceed. Possibly, however, the driver is also located outside the vehicle; in that case, the warning message can be output, for example, at a mobile display device, for example, a smart key or a smartphone.

It is also possible that the action can be that the parking process is interrupted. The motor vehicle is, for example, stopped, and the driver can then decide how to further proceed. It is also possible that the action is that the motor vehicle is automatically driven in reverse, for example, is brought back to the starting point of the autonomous parking process. It is also possible that the motor vehicle is driven in reverse only until it is detected—by carrying out the above-described method, in which a braking torque is applied and speed differentials are evaluated—that a variable characterizing the slip (for example, the absolute value of the speed differential) falls below a limiting value.

However, if it is detected in the comparison block 40, above, that the absolute value of the speed differential is less than the limiting value, the application of the braking torques and the evaluation of the wheel rotational speeds is paused, which is implemented by a comparison block 46. In this comparison block 46, the distance covered is initially ascertained on the basis of the speed of the motor vehicle 10. A return to the point upstream from the block 38 takes place, i.e., the braking torques are applied to the front wheels 26a and 26b again, only if the distance covered reaches or exceeds a limiting value. The limiting value is preferably approximately ⅓ to ⅔, more preferably approximately ½, of the distance between the front axle 22 and the rear axle 24. In this way, a discontinuous, in particular cyclical, application of the braking torque or the braking torques is achieved. This saves energy and nevertheless ensures that the wheels of an axle—in the present case, of the rear axle 24, by way of example—are always on a surface 18 having a comparatively good grip. Provided the limiting value has not yet been reached or exceeded, a return to the point upstream from the comparison block 46 takes place.

The method has been described in a variant, in which the first braking torque and the second braking torque are applied to both wheels 26a and 26b of the same axle, namely the front axle 22. In a method variant that is not represented, the two braking torques could also be applied to the two wheels 28a and 28b of the non-driven rear axle 24. In this case, the right front wheel 26b would rotate faster than the rear wheels 28a and 28b due to the slip of the slippery area 32. In addition, the method could also include that the two braking torques are equal, or that one of the two braking torques is equal to zero. Of course, the method can also be utilized in a motor vehicle 10, in which it is not the front axle 22, but rather the rear axle 24 that is driven. Since, in principle, in each alternative, the presence of a slippery area is detected at a point in time at which at least the wheels of one axle are on a surface having a good grip, no differences result here. The same applies for a change of a steering angle, which also barely has any effect on the method. It should be noted, however, that the wheel on the outside of the curve always rotates slightly faster depending on the steering angle. In this case, an appropriately higher speed differential must be permitted, so that a slip and/or a slippery surface 18 are/is not erroneously detected.

It is also possible to make the level of the braking torque or both braking torques or even the implementation of the method dependent upon a parameter, for example, the inclination of the surface 18 expressed by the angle 20, a parking situation, an ambient temperature detected by a temperature sensor (not represented), a time of year ascertained via a clock (also not represented) of the motor vehicle 10, and/or a current precipitation, which can be detected, for example, via the operation of windshield wipers (also not represented) of the motor vehicle 10 or, for example, by means of a rain sensor.

The invention claimed is:

1. A method for operating a motor vehicle during an autonomous parking process, the method comprising:
   analyzing a driving condition of the motor vehicle during the autonomous parking process by:
      automatically applying a first braking torque to at least a first wheel of the motor vehicle and a second braking torque to at least a second wheel of the motor vehicle, wherein the automatically applying of the first and second braking torques is not performed in conjunction with a desired deceleration of the motor vehicle; and determining a slip of one of the first wheel and the second wheel based on a comparison of a rotational speed of the first wheel to which the first braking torque is applied with a rotational speed of the second wheel to which the second braking torque is applied; and automatically triggering an action in response to a variable characterizing the slip one of reaching and exceeding a limiting value.

2. The method as claimed in claim 1, wherein the first wheel and the second wheel are wheels of a same axle of the motor vehicle, the same axle being a driven axle or a non-driven axle.

3. The method as recited in claim 1, wherein the first wheel is of a first axle of the motor vehicle and the second wheel is of a second axle of the motor vehicle, one of the first axle and the second axle being a driven axle and the other of the first axle and the second axle being a non-driven axle.

4. The method as claimed in claim 1, wherein the first braking torque and the second braking torque are identical.

5. The method as claimed in claim 1, wherein the first braking torque and the second braking torque are different.

6. The method as claimed in claim 5, wherein the second braking torque is equal to zero.

7. The method as claimed in claim 1, the automatically applying further comprising:

applying at least one of the first braking torque and the second braking torque discontinuously.

8. The method as claimed in claim 1, wherein the analyzing of the driving condition is performed cyclically at a prespecified cycle time, the prespecified cycle time corresponding to a time it takes for the motor vehicle to cover a predetermined distance.

9. The method as claimed in claim 1, the automatically triggering the action further comprising at least one of:

outputting a piece of information to a driver of the motor vehicle;

interrupting the autonomous parking process;

driving the motor vehicle in reverse until it is detected that the variable characterizing the slip falls below the limiting value; and driving the motor vehicle in reverse into a starting position.

10. The method as claimed in claim 1, wherein at least one of an intensity of the first braking torque and an intensity of the second braking torque depends on at least one parameter, the at least one parameter including at least one of (i) an inclination of a surface on which the motor vehicle is located, (ii) a parking situation of the motor vehicle, (iii) an ambient temperature, (iv) a time of year, and (v) a precipitation.

11. The method as claimed in claim 1, wherein the method is carried out by a computer program.

12. An non-transitory electrical storage medium for a controller of a motor vehicle, the controller being at least one of an open-loop controller and closed-loop controller, the non-transitory electrical storage medium storing a computer program that, when executed by the controller, during an autonomous parking process, causes the controller to:

analyze a driving condition of the motor vehicle during the autonomous parking process by:

automatically applying a first braking torque to at least a first wheel of the motor vehicle and a second braking torque to at least a second wheel of the motor vehicle, wherein the automatically applying of the first and second braking torques is not performed in conjunction with a desired deceleration of the motor vehicle; and determining a slip of one of the first wheel and the second wheel based on a comparison of a rotational speed of the first wheel to which the first braking torque is applied with a rotational speed of the second wheel to which the second braking torque is applied; and automatically trigger an action in response to a variable characterizing the slip one of reaching and exceeding a limiting value.

13. A controller for a motor vehicle, the controller being at least one of an open-loop controller and closed-loop controller the controller comprising:

a processor; and an electrical storage medium, wherein the processor is configured to, during an autonomous parking process:

analyze a driving condition of the motor vehicle during the autonomous parking process by:

automatically applying a first braking torque to at least a first wheel of the motor vehicle and a second braking torque to at least a second wheel of the motor vehicle, wherein the automatically applying of the first and second braking torques is not performed in conjunction with a desired deceleration of the motor vehicle; and determining a slip of one of the first wheel and the second wheel based on a comparison of a rotational speed of the first wheel to which the first braking torque is applied with a rotational speed of the second wheel to which the second braking torque is applied; and automatically trigger an action in response to a variable characterizing the slip one of reaching and exceeding a limiting value.

14. The method as claimed in claim 8, wherein the predetermined distance is from ⅓ to ⅔ of a distance between a first axle and a second axle of the motor vehicle.

* * * * *